US011462838B2

(12) United States Patent
Eitan et al.

(10) Patent No.: US 11,462,838 B2
(45) Date of Patent: Oct. 4, 2022

(54) TAPERING FOR MIMO

(71) Applicant: QUALCOMM Incorporated, San Diego, CA (US)

(72) Inventors: Alecsander Petru Eitan, Haifa (IL); Evgeny Levitan, Haifa (IL); Evyatar Hemo, Kiryat Bialik (IL)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 16/914,127

(22) Filed: Jun. 26, 2020

(65) Prior Publication Data

US 2021/0408696 A1 Dec. 30, 2021

(51) Int. Cl.
*H01Q 21/22* (2006.01)
*H01Q 21/08* (2006.01)
*H04B 7/0456* (2017.01)
*H01Q 9/04* (2006.01)
*H04B 7/0452* (2017.01)

(52) U.S. Cl.
CPC ........... *H01Q 21/22* (2013.01); *H01Q 9/0407* (2013.01); *H01Q 21/08* (2013.01); *H04B 7/0452* (2013.01); *H04B 7/0465* (2013.01)

(58) Field of Classification Search
CPC ...... H01Q 21/22; H01Q 9/0407; H01Q 21/08; H04B 7/0452; H04B 7/0465

USPC ........................................................ 342/128
See application file for complete search history.

(56) References Cited

U.S. PATENT DOCUMENTS

2009/0003634 A1* 1/2009 Kushida ................. H04R 3/005
                                                                            381/300
2019/0207322 A1* 7/2019 Ding ......................... G01S 7/03

OTHER PUBLICATIONS

Zhang W., et al., "Tapering Approach for MIMO Radar with Virtual Transmitting-Receiving Beamforming," International Journal of Digital Content Technology and its Applications (JDCTA), Oct. 2012, vol. 6, No. 19, pp. 330-338.

* cited by examiner

*Primary Examiner* — Leila Malek
(74) *Attorney, Agent, or Firm* — Haynes and Boone, LLP

(57) ABSTRACT

A transceiver having a virtual array is disclosed that includes a transmit antenna array and a receive antenna array. The transmit antennas are spaced apart by a transmit array spacing. Similarly, the receive antennas are spaced apart by a receive array spacing. One of the receive and transmit arrays has more antenna elements than a ratio of either the transmit array spacing divided by the receive array spacing or of the receive array spacing divided by the transmit array spacing.

27 Claims, 9 Drawing Sheets

```
┌─────────────────────────────────────────────────────────────┐
│ adjusting a gain for a plurality of transmit amplifiers      │
│ according to a first window function to provide a plurality  │
│ of gain-adjusted amplifiers corresponding to a plurality of  │
│ transmit antennas spaced apart according to a transmit       │——600
│ array spacing                                                │
└─────────────────────────────────────────────────────────────┘
                              │
                              ▼
┌─────────────────────────────────────────────────────────────┐
│ amplifying radio frequency (RF) signals through the          │
│ plurality of gain-adjusted amplifiers to transmit a          │——605
│ corresponding amplified RF signal through each of the        │
│ transmit antennas to produce a reflected RF signal           │
└─────────────────────────────────────────────────────────────┘
                              │
                              ▼
┌─────────────────────────────────────────────────────────────┐
│ receiving the reflected RF signal through an array of        │
│ receive antennas spaced apart according to a receive array   │
│ spacing to provide a corresponding plurality of received     │——610
│ RF signals, N being a positive integer that is greater than  │
│ the transmit spacing divided by the receive spacing          │
└─────────────────────────────────────────────────────────────┘
                              │
                              ▼
┌─────────────────────────────────────────────────────────────┐
│ adjusting a gain for a plurality of receive amplifiers       │
│ according to a second window function to provide a           │——615
│ plurality of gain-adjusted receive amplifiers corresponding  │
│ to the plurality of received RF signals                      │
└─────────────────────────────────────────────────────────────┘
                              │
                              ▼
┌─────────────────────────────────────────────────────────────┐
│ amplifying each received RF signal through the corresponding │
│ gain-adjusted receive amplifier to provide a plurality of    │
│ gain-adjusted received RF signals that are effectively       │——620
│ received through a virtual array having a taper that         │
│ increases monotonically from a beginning of the virtual      │
│ array to a center of the virtual array                       │
└─────────────────────────────────────────────────────────────┘
```

FIG. 6

TAPERING FOR MIMO

TECHNICAL FIELD

This application relates to virtual antenna arrays, and more particularly to a tapering for a virtual antenna array.

BACKGROUND

As the wavelength is reduced for higher frequency transmissions, the corresponding antenna size is also reduced. The higher frequencies that have been adopted in telecommunication standards such as 5G New Radio (NR), WLAN, and automotive radar thus enable the use of multiple antennas in a single device. To reduce costs and decrease the number of total antennas, a transmit antenna array and a separate receive antenna array may interact to form a virtual array. For example, in a MIMO radar with a virtual array, a transmitter may transmit pulses over the transmit antenna array. A receiver in the MIMO radar then receives reflected pulses over the receive antenna array. The resulting virtual array may have increased angular resolution and other benefits as compared to a traditional antenna array with the same number of antennas.

SUMMARY

In accordance with a first aspect of the disclosure, a transceiver is provided that includes: a plurality of transmit antennas spaced apart according to a transmit array spacing; a plurality of transmit amplifiers corresponding to the plurality of transmit antennas, each transmit amplifier having an output coupled to the corresponding transmit antenna; a plurality of N receive antennas spaced apart according to a receive array spacing, the plurality of N receive antennas being configured to receive a plurality of radio frequency (RF) signals, N being greater than the transmit array spacing divided by the receive array spacing; a plurality of receive amplifiers corresponding to the plurality of N receive antennas, each receive amplifier having an input coupled to the corresponding receive antenna and being configured to amplify a corresponding received RF signal; and a controller configured to control a gain of each transmit amplifier according to a first window function and to control a gain of each receive amplifier according to a second window function so that the plurality of RF signals are effectively received by a virtual array having a taper defined by a third window function.

In accordance with a second aspect of the disclosure, a transceiver is provided that includes: a plurality of M transmit antennas spaced apart according to a transmit array spacing; a plurality of transmit amplifiers corresponding to the plurality of M transmit antennas, each transmit amplifier having an output coupled to the corresponding transmit antenna; a plurality of receive antennas spaced apart according to a receive array spacing, the plurality of receive antennas being configured to receive a plurality of RF signals, M being greater than the receive array spacing divided by the transmit array spacing; a plurality of receive amplifiers corresponding to the plurality of receive antennas, each receive amplifier having an input coupled to the corresponding receive antenna and being configured to amplify a corresponding received RF signal; and a controller configured to control a gain of each transmit amplifier according to a first window function and to control a gain of each receive amplifier according to a second window function so that the plurality of RF signals are effectively received by a virtual array having a taper defined by a third window function.

In accordance with a third aspect of the disclosure, a virtual array method is provided that includes: adjusting a gain for a plurality of transmit amplifiers according to a first window function, each of the transmit amplifiers being coupled to a respective transmit antenna of an array of transmit antennas spaced apart according to a transmit array spacing; amplifying RF signals through the plurality of transmit amplifiers to transmit respective amplified RF signals through the transmit antennas to produce reflected RF signals; receiving the reflected RF signals through an array of receive antennas spaced apart according to a receive array spacing to provide a plurality of received RF signals, wherein the transmit array spacing and the receive array spacing are unequal, and wherein a number of antennas in the transmit array or the receive array having a smaller array spacing is greater than a larger array spacing divided by the smaller array spacing; adjusting a gain for a plurality of receive amplifiers according to a second window function, each of the receive amplifiers being coupled to a respective receive antenna of the array of receive antennas; and amplifying each received RF signal through the respective receive amplifier to provide a plurality of gain-adjusted received RF signals that are effectively received through a virtual array having a taper defined by a third window function.

These and other advantageous features may be better appreciated through the following detailed description.

BRIEF DESCRIPTION OF THE DRAWINGS

FIG. 6 is a flowchart for a method of operating a virtual array with improved taper in accordance with an aspect of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
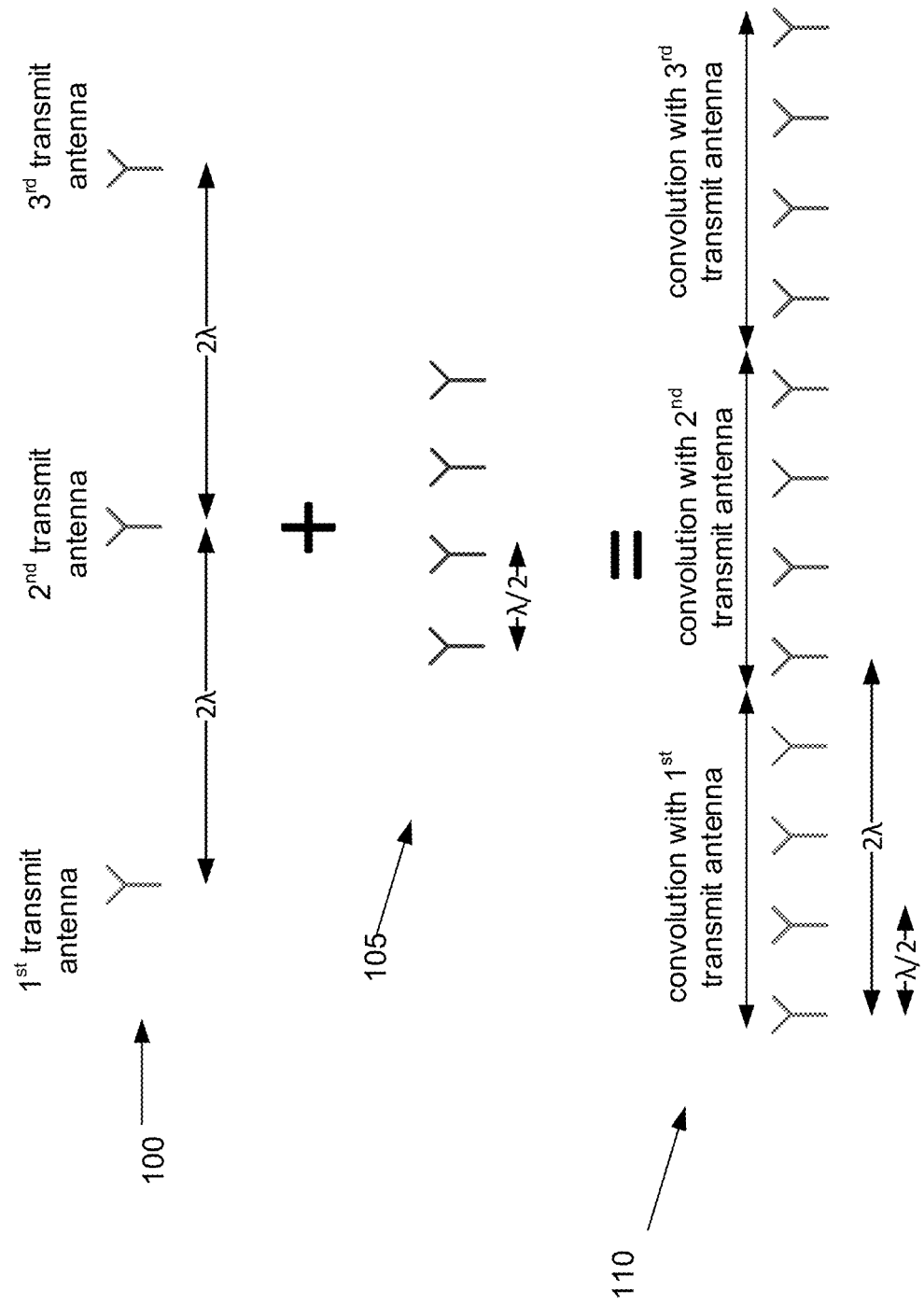
FIG. 1A illustrates a conventional one-dimensional virtual array in which the number of receive antennas in a receive array equals a spacing for the transmit antennas in a transmit array divided by a spacing for the receive antennas in the receive array.

Virtual arrays advantageously increase the effective number of antennas for both transmission and reception at a given signaling wavelength. The resulting effective increase in the number of antennas for a virtual antenna array is quite advantageous with respect to providing a narrow main beam. Such a narrow main beam is important with regard to directly increasing the angular resolution and indirectly increasing Doppler resolution in applications such as MIMO radar. The transmit array and receiver array for a virtual array is equivalent to a conventional array having a greater number of antennas than the total number of antennas in the transmit array and the receive array. Despite these advantages, the sidelobes of the equivalent conventional array without taper have a power profile that is proportional to a $sinc^2$ function. In some implementations, the first sidelobe power is reduced by only 13 dB from that of the main lobe.

Such a relatively-high sidelobe amplitude is undesirable as large targets in the sidelobe may be mistakenly considered to be illuminated by the main lobe. To suppress the sidelobes yet still have a narrow main beam, it is thus conventional to implement tapering with a window function in a conventional array. Without tapering, each transmitting antenna in the array receives the same signal power (assuming that there is no compensation for RF trace losses or other impairments). Similarly, the received signal from each receiving antenna receives the same amplification without tapering under the same assumptions. But the window function in a tapering approach for a conventional linear array produces markedly different signal amplitudes across the array. There are numerous conventional window functions such as a Dolph-Chebyshev window function. But conventional window functions are not applicable for a MIMO radar array (or in other implementations of virtual arrays). This may be better understood with a consideration of the following virtual array discussion.

In a virtual array, the number of transmit antennas may be denoted by an integer $N_T$. There are thus $N_T$ transmitted RF signals from the $N_T$ transmit antennas. The number of receive antennas may be denoted by an integer $N_R$. If the arrays were combined to form a traditional antenna array, the total number of antennas would thus be $N_T + N_R$. But in a virtual array formed by the same transmit and receive antennas, the number of effective antennas is greater than the sum of $N_T + N_R$ (e.g, the number of effective antennas may be $N_T * N_R$). To achieve this virtual array performance, the $N_T$ transmitted RF signals may be mutually orthogonal or quasi-orthogonal. Each receive antenna may thus receive $N_T$ mutually-orthogonal reflected RF signals. In such embodiments, there are thus $N_T$ mutually-orthogonal signals that can be received at a first one of the receive antennas, another $N_T$ mutually-orthogonal signals that can be received at a second one of the receive antennas, and so on. A receiver coupled to the receive antennas may then distinguish between a total of $N_T * N_R$ received signals. Even though there are only $N_R$ receive antennas, the resulting virtual array performance is equivalent to having $N_R * N_T$ effective antennas.

The location of the effective antennas in the virtual array is a function of the location of the transmit and receive antennas. For example, the locations for the transmit antennas may be defined as a set of vectors $X_T$. Each vector points to the corresponding transmit antenna location. Such a set of vectors may be represented by a set of Dirac impulse functions $\delta(X-X_{Ti})$ that each have a value of one at the corresponding antenna location and are zero elsewhere. The integer i would range from 0 to $N_T-1$. Similarly, the receive antenna locations may be defined as a set of vectors $X_R$ and corresponding Dirac impulse functions $\delta(X-X_{Rj})$, where the integer j would range from 0 to $N_R-1$. The location function to the effective antennas in the corresponding virtual array is approximately a convolution of the two sets of Dirac impulse functions. In particular, the effective antenna locations for the virtual array are defined by a midpoint location vector $(X-(X_{Ti}+X_{Rj})/2)$ of the corresponding transmit and receive antennas, which is quite close to the location vector $(X-(X_{Ti}+X_{Rj}))$ produced by a true convolution.

Given the effective convolution between the location vectors for the transmit and receive arrays, it is conventional for the antenna array (either receive or transmit) with the larger number of antennas to be a function of the spacing between the antennas in each of the transmit and receive arrays. The following discussion will assume that both arrays are uniformly spaced but it will be appreciated that the principles discussed herein are applicable to non-uniformly spaced antenna arrays as well. In addition, the following discussion will assume that the antenna array with the larger number of antennas is the receive array although this is arbitrary and can be reversed in alternative implementations. Although the transmit array can be the array with the larger number of elements, recall that the $N_T$ transmitted signals may be mutually orthogonal. It may thus simplify the MIMO system design to have the transmit array be the array with the fewer number of antennas. With these assumptions in mind, it is conventional that the number of antennas in the receive array is the uniform spacing of the transmit array divided by the uniform spacing of the receive array. For example, suppose that the uniform spacing of a transmit array 100 of three transmit antennas ($N_T=3$) as shown in FIG. 1A is 2 wavelengths for the carrier frequency to be received through the virtual array. The uniform spacing of the receive array would typically be ½ of this wavelength ($\lambda$) but the receive array uniform spacing may be greater than or less than $\lambda/2$ in alternative embodiments. If the uniform spacing of a receive array 105 is $\lambda/2$ and the uniform spacing of the transmit array is $2\lambda$, it would thus be conventional for the receive array to have $2/(½)=4$ antennas ($N_R=4$). A resulting equivalent conventional linear array 110 would then have 12 effective antennas (3*4=12) despite the use of just seven actual antennas.

The effective convolution of the receive antenna array locations with a location for a first transmit antenna produces a first set of 4 effective antennas for the equivalent or effective array 110. Similarly, the effective convolution with between the locations of the receive antennas with a location of a $2^{nd}$ transmit antenna array produces a second set of four effective antennas for equivalent array 110. Finally, the effective convolution of the locations of the receive antennas with a location of a $3^{rd}$ transmit antenna produces a $3^{rd}$ set of four effective antennas. Because the total length of the receive array is $2\lambda$, its convolution with the transmit antennas results in no overlap between the three sets of effective antennas in equivalent array 110. The number $N_R$ in such cases may thus be denoted as $N_{conventional}$, where $N_{conventional}$ equals the spacing of the transmit array (in this example, the array with the fewest antennas) divided by the spacing of the receive array (the array with the most antennas in this example). As shown for equivalent array 110, each transmit antenna corresponds to a set of $N_R$ effective antennas if $N_R$ equals $N_{conventional}$ such that the total number of effective antennas is the product $N_T*N_R$. Note that in embodiments in which the transmit array has more antennas than the receive array, $N_{conventional}$ for the transmit array equals the receive array spacing divided by the transmit array spacing. In general, $N_{conventional}$ thus equals the spacing for the array with the fewer number of antennas (the array with the greatest distance between antenna elements) divided by the spacing for the array with the larger number of antennas (the array with the smallest distance between antenna elements).

Figure 1B:
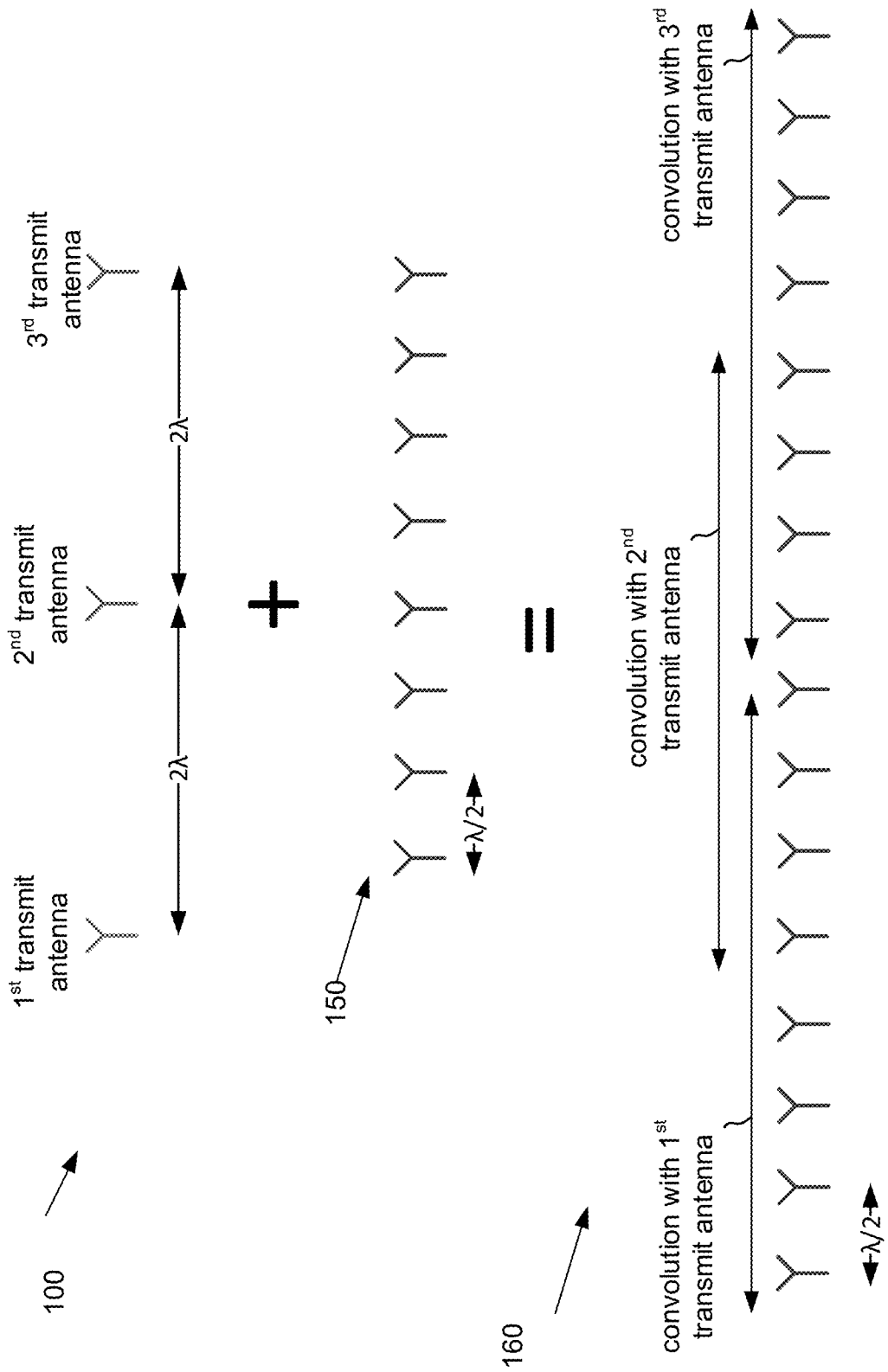
FIG. 1B illustrates a one-dimensional virtual array in which the number of receive antennas in a receive array are greater than a spacing for the transmit antennas in a transmit array divided by a spacing for the receive antennas in the receive array in accordance with an aspect of the disclosure.

Referring again to equivalent array 110, as $N_R$ is increased to be greater than $N_{conventional}$, the sets of effective antennas resulting from the transmit antenna locations begin to overlap in the resulting equivalent array. For example, transmit array 100 is repeated in FIG. 1B but a receive array 150 that is combined to make a virtual array with transmit array 100 has twice as many antennas as the receive array 105 discussed earlier. Receive array 150 has the same uniform spacing of λ/2 but has eight receive antenna ($N_R$=8), which is twice $N_{conventional}$ for the transmit and receive antenna arrays spacings.

Since $N_R$ equals eight, which is twice $N_{conventional}$ in this example, each set of effective antennas resulting from a transmit antenna location convolved with the receive antenna locations produces an effective set of antenna locations that overlaps with an adjacent set of effective antennas. The effective convolution of the receive antenna array 150 with the first transmit antenna in transmit array 100 produces a first set of eight effective antennas in a resulting effective or equivalent array 160. Similarly, the effective convolution of the receive antenna array 150 with the third transmit antenna produces a second set of eight effective antennas in effective array 160. But the effective convolution of the receive antenna array 150 with the second transmit antenna produces no additional effective antenna locations as the effective antenna locations that result from this convolution are duplicates of antennas locations in the first and second sets of effective antennas in equivalent array 160. The number of effective antennas locations in equivalent array 160 is thus $(N_T*N_R)-N_R$ due to the overlapping of $N_R$ of the effective antennas.

In general, it would thus be undesirable to increase the number of antennas in the receive array (or the number of antennas in the transmit array if that is the array with more antennas) greater than $N_{conventional}$ since the resulting equivalent array will have less than $N_T*N_R$ effective antennas. But as disclosed herein, the number of antennas for the array with the greatest number of antennas is increased over $N_{conventional}$ (e.g, at least $1.5*N_{conventional}$ in some embodiments) because of the beneficial tapering that results. In general, the taper applied to the array with the greater number of antennas (in the examples above, the receive array) may be designated as a first window function whereas the taper applied to the array with the fewer number of antennas (the transmit array in the preceding examples) may be designated as a second window function. As used herein, the term "window function" refers to a function having a first half in which the function monotonically increases from a first minimum value to a central maximum value and having a second half in which the function monotonically decreases from the central maximum value to a second minimum value. In some embodiments, a window function as defined herein is a symmetric function such that the first half and the second half are mirror images of each other. The first window function and the second window function along with the increasing of the number of antennas to be greater than $N_{conventional}$ in the array with the greater number antennas results in a taper for the virtual array that is defined by a third window function. As used herein, the term "taper" refers to a gain profile for an antenna array (real or virtual) regardless of whether that gain profile defines a window function or not.

Figure 2A:
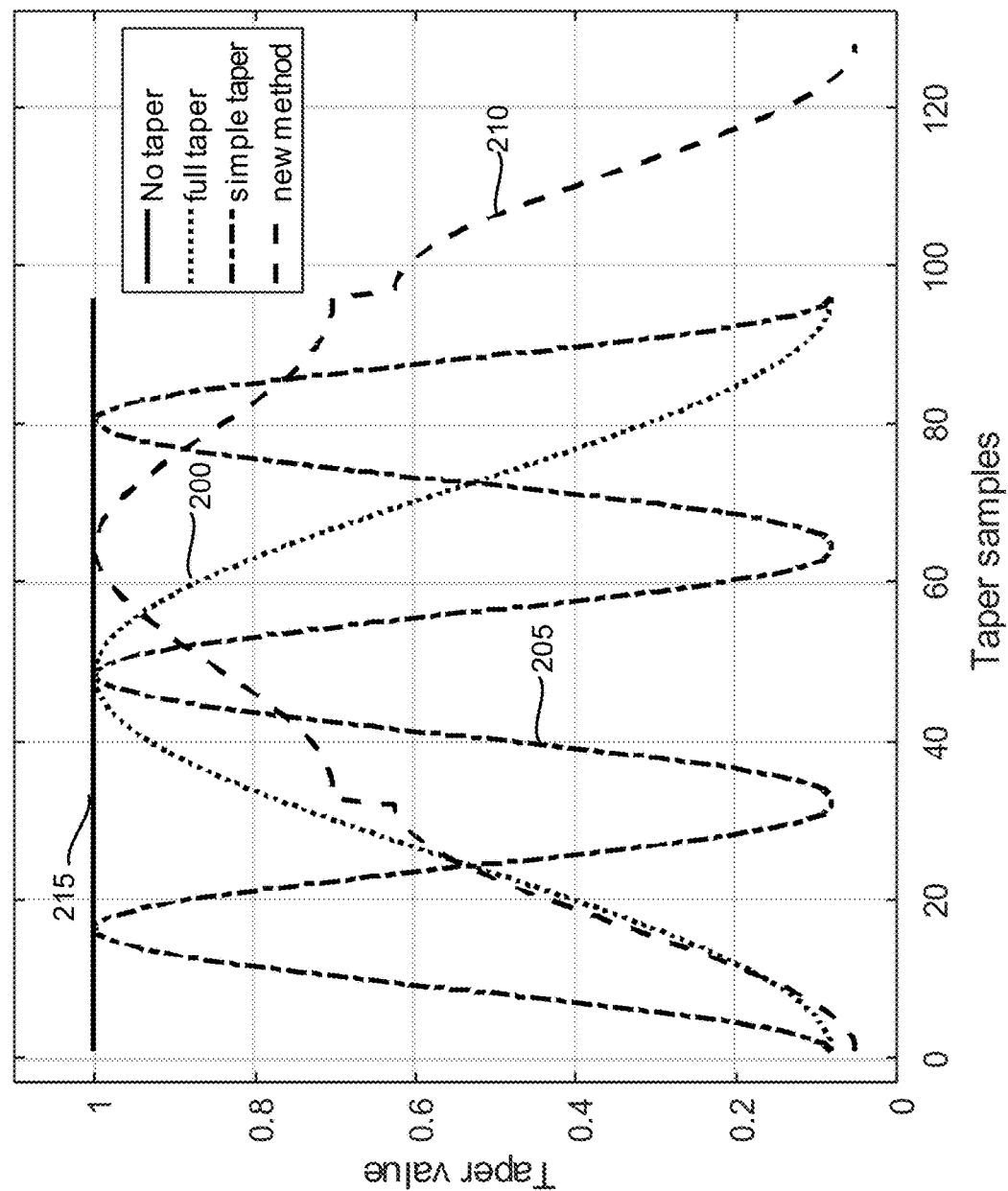
FIG. 2A illustrates a conventional taper profile for a linear array, a taper profile for a conventional one-dimensional virtual array, and an improved taper profile for a one-dimensional virtual array in accordance with aspect of the disclosure.

This salutary effect on the tapering may be better appreciated through an example window function defining the gain profile for a conventional uniform linear array having 96 antennas with a uniform spacing of ½λ. For example, it would be conventional to apply a standard tapering such as a Dolph-Chebyshev, Kaiser, Hamming, or a Hann window function to such a conventional array to produce a gain profile 200 across the 96 antenna locations as shown in FIG. 2A. The taper (which in this case is a window function) for such a conventional uniform linear array is straightforward and well-behaved. The gain for a particular antenna in taper profile 200 maybe designated as a taper sample. Taper 200 is normalized to the two center-most taper samples, which are considered to have a one value. The remaining taper samples drop off in a gaussian-like fashion from this maximum value in either direction. A power amplifier in a transmitter that is generating the RF signal for the center-most pair of antennas would thus generate a maximum signal amplitude. But the power amplifier for the remaining antennas would have their power reduced from this maximum power according to their taper value. For example, the first sample in taper 200 is approximately 0.05 so the corresponding power amplifier would be powered-down so the amplitude for the same signal would be just 0.05 times the amplitude for the center-most antennas.

But such a conventional taper applied to just the receive array is not suitable for a virtual array. For example, a conventional virtual array having the same number (96) of effective antennas may be produced by a transmit array of three transmit antennas having a uniform spacing of 16λ and a receive array of 32 receive antennas having a uniform spacing of ½λ. In such an example, the receive antenna array has the $N_{conventional}$ number of receive antennas. If a conventional taper is applied to the receive antenna array in such a virtual array example, it results in a gain profile 205 that does not define a window function as defined herein since there is not a first half in which gain profile 205 monotonically increases from a first minimum value to a maximum value and since there is not a second half in which gain profile 205 monotonically decreases from the maximum value to a second minimum value. But the effective convolution that produces the resulting virtual array forces gain profile 205 to have a behavior that is quite different from desired taper 200. The resulting virtual array has 96 effective antennas so gain profile 205 also extends across all 96 effective antennas. Due to the convolution with the three transmit antenna locations, gain profile 205 has three gaussian-like peaks that all reach the maximum normalized value. Gain profile 205 has a maximum normalized value for the center-most effective antennas like desired taper 200. But gain profile 205 is far from ideal in that an effective antenna at approximately taper sample 17 and taper sample 81 will also receive the maximum normalized value. In a radar application such as automobile navigation and collision avoidance, a target in the sidelobes may thus be mistaken for a main-lobe-located target, which is plainly undesirable.

Figure 2B:
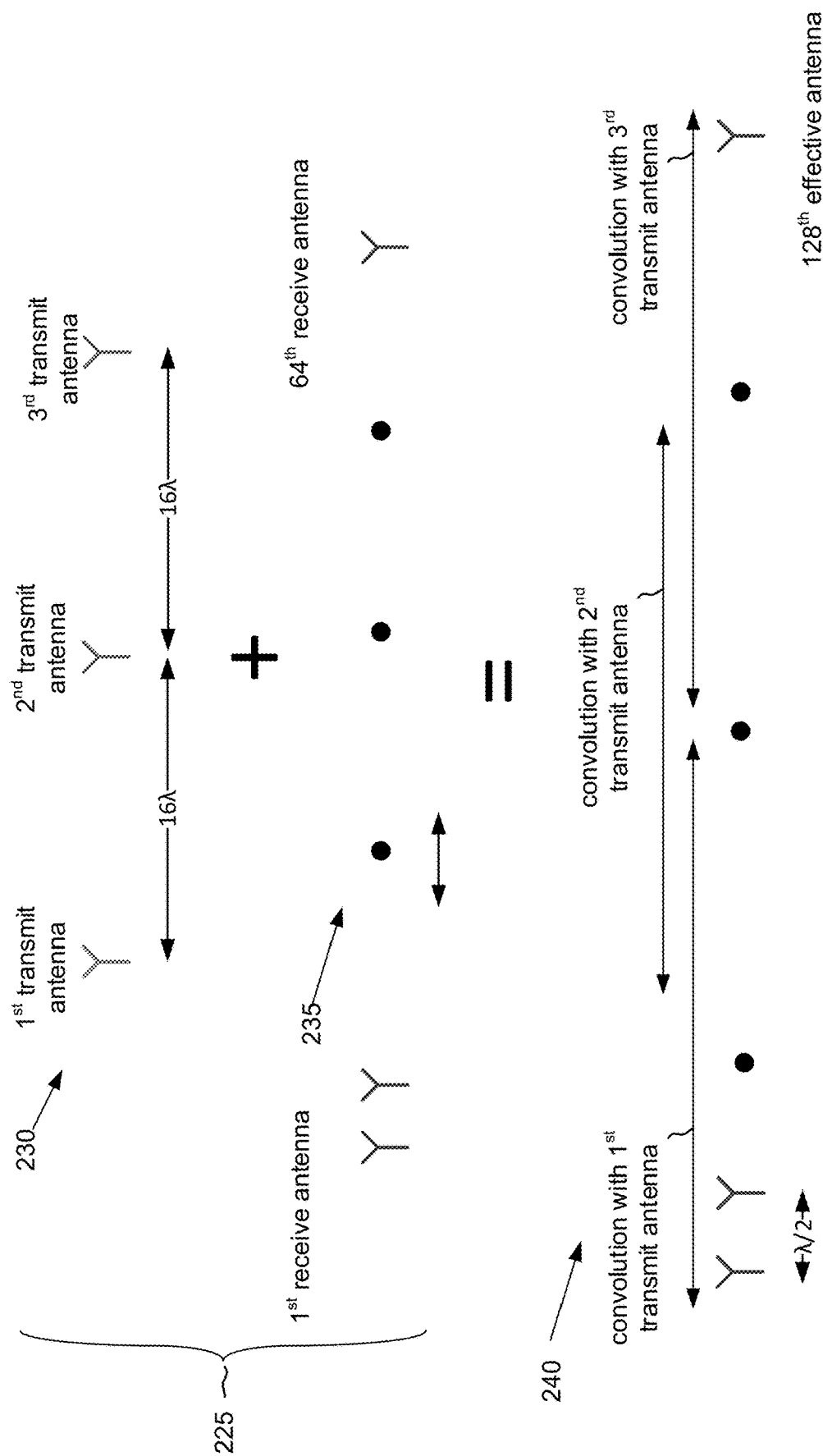
FIG. 2B illustrates the one-dimensional virtual array with improved tapering of FIG. 2A and the corresponding equivalent linear array.

In the following discussion, the term "array size" is defined to refer to the number of antennas in the array. An improved taper is achieved herein by deliberately increasing the receive array size to be greater than $N_{conventional}$ (e.g., at least 1.5 times $N_{conventional}$). For example, the array size may be $1.5*N_{conventional}$, $1.75*N_{conventional}$, $2*N_{conventional}$, $2.1*N_{conventional}$, and so on. Consider a virtual array 225 as produced by a transmit array 230 and a receive array 235 as shown in FIG. 2B. Transmit array 230 has three transmit antennas spaced apart by sixteen λ. As discussed with regard to taper 200, the corresponding $N_{conventional}$ for receive array 235 would be 32 receive antennas spaced apart by ½λ. But receive array 235 instead has sixty-four receive antennas that are spaced apart by ½λ. The resulting equivalent linear array 240 thus has 128 effective antennas since the convolution with the second transmit antenna is entirely overlapping with the convolutions with the first transmit antenna and third transmit antennas as analogously discussed for FIG. 1B. Given this over-sizing of receive array 235, a window function for receive array 235 may be a Dolph-Chebyshev, Kaiser, Hamming, Hann, and so on. Alternatively, receive array 235 may receive a customized taper that is a variation on such conventional window functions. The array with the fewer number of antennas or the greatest spacing between antennas (in this case, transmit array 230) receives another window function. For example, the window function for transmit array 230 may be 0.66, 1.0, and 0.66, respectively for the first, second and third transmit antennas.

The result of the over-sizing for the receive array 235 and the window functions for the transmit and receive arrays in virtual array 225 results in a window function or gain profile 210 as shown in FIG. 2A for the effective antennas in virtual array 225. Window function 210 has an approximate gaussian profile. Although it is somewhat imperfect as compared to ideal taper 200, window function 210 is far more ideal than conventional gain profile 205. A no-taper profile 215 for the conventional linear array is also shown in FIG. 2A for comparison purposes.

Figure 3:
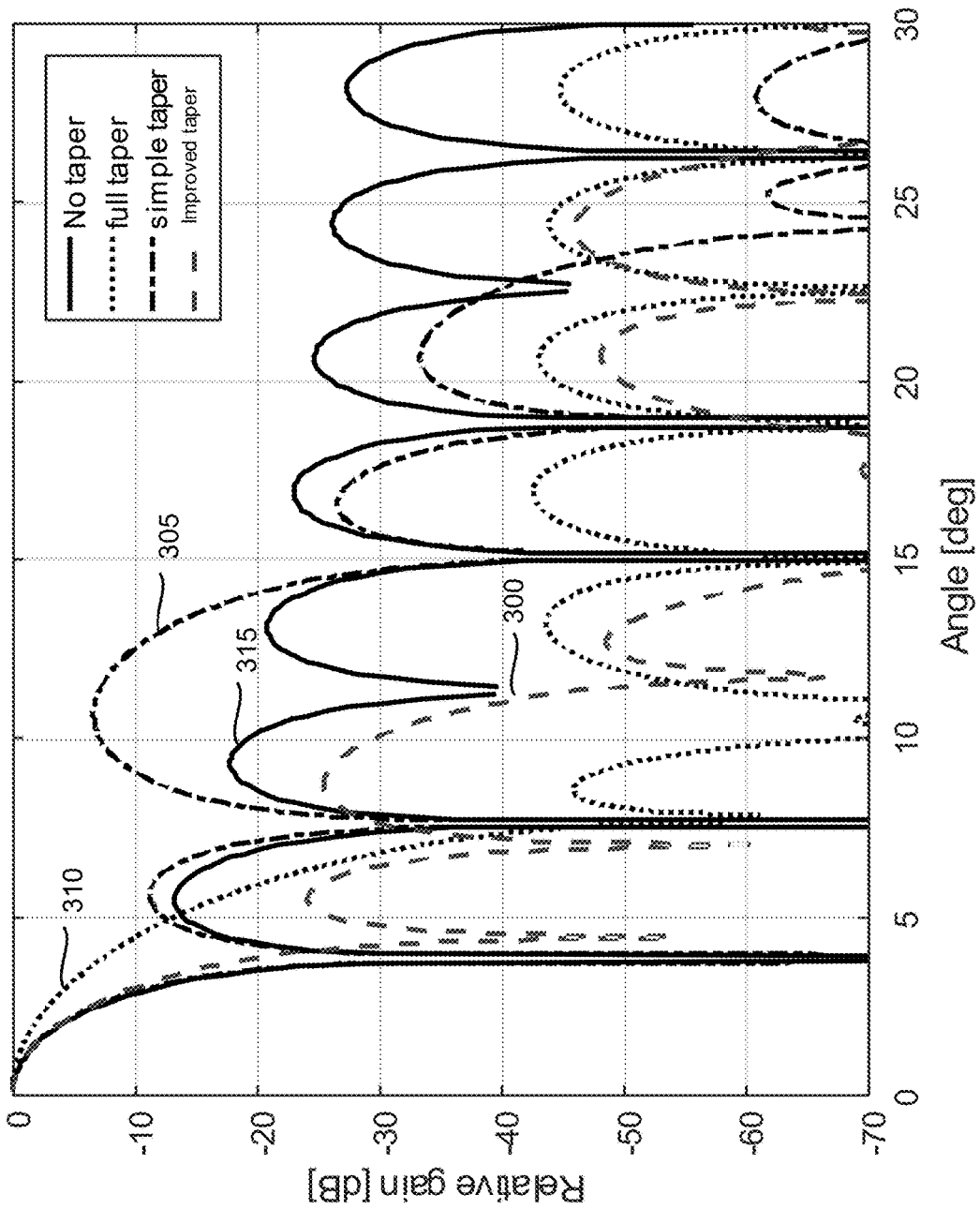
FIG. 3 illustrates a radiation pattern for a linear array with a conventional taper, a conventional one-dimensional virtual array with tapering, and a one-dimensional virtual array with improved tapering in accordance with aspect of the disclosure.

Turning now to FIG. 3, an improved radiation pattern 300 for virtual array 225 is shown. Recall that $N_{conventional}$ for virtual array 225 is 32. A radiation pattern 305 (the "simple taper") is also shown in FIG. 3 for a virtual array that results from such an $N_{conventional}$-sized receive array and transmit array 230 in which a window function is only applied to the receive array. As compared to radiation pattern 305, improved radiation pattern 300 for virtual array 225 has sidelobes that are advantageously reduced in magnitude. A radiation pattern 310 (the "full taper") for a uniform linear array having 96 antennas spaced apart by ½λ with a conventional taper is also shown for comparison purposes. In addition, a radiation pattern 315 (the "no taper") for a uniform linear array having 96 antennas spaced apart by ½λ without any tapering is shown as well. Because of the lack of tapering, the sidelobes in radiation pattern 315 drop off according to a sinc² function as the angle increases from 0 degrees such that a peak of a first sidelobe in radiation pattern 315 at approximately 5 degrees is only reduced by around 13 dB from the main beam peak power at 0 degrees. Radiation pattern 305 for the conventional virtual array with its receive-array-only taper is even worse in that a peak power for a second sidelobe in radiation pattern 305 at approximately 11 degrees is only reduced by around 7 dB from the main beam peak power. But in improved radiation pattern 300 for virtual array 225, the peak sidelobe power for a first sidelobe at approximately 5 degrees is markedly reduced by around 24 dB from the main beam peak power.

For a four-antenna array, the second window function may be approximately 0.5, 1, 1, 0.5, respectively, for the first antenna, the second antenna, the third antenna, and the fourth antenna in the array. The second window function for a five-antenna transmit array, a six-antenna transmit array, and so on would be analogous. As noted earlier, the first window function may be a Dolph-Chebyshev, Kaiser, Hamming, or a Hann window function (or a custom variation of such window functions).

Figure 4:
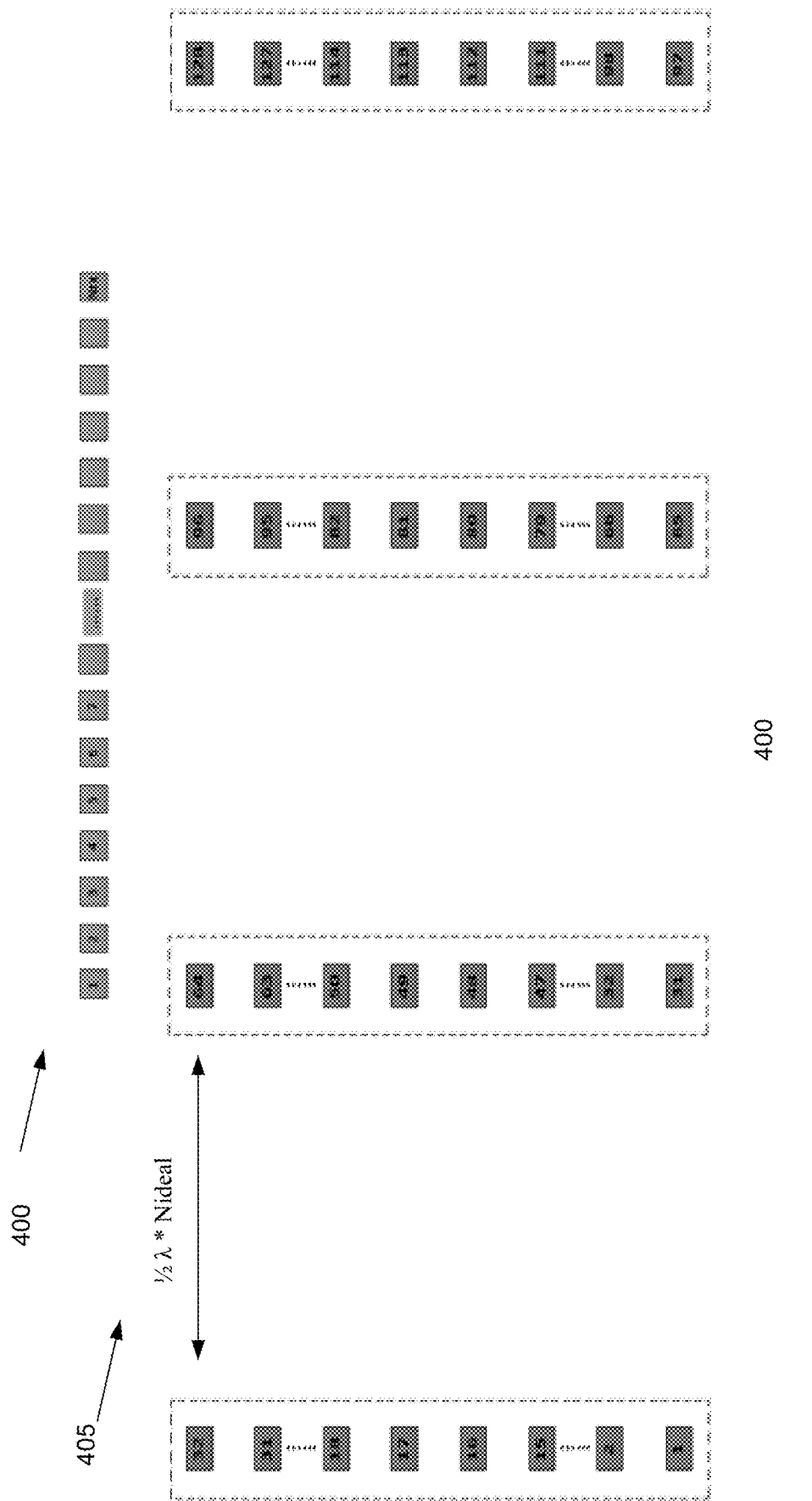
FIG. 4 illustrates a two-dimensional virtual array formed by a transmit array arranged in rows and columns and by a receive array arranged in a row in accordance with an aspect of the disclosure.

The over-sizing and window functions disclosed herein may also be applied to a two-dimensional (arranged by rows and columns) virtual array. For example, a receive array 400 as shown in FIG. 4 may have $K*N_{conventional}$ receive antennas with a ½λ spacing. A transmit array 405 has a plurality of rows of transmit antennas. Each row of transmit antennas in transmit array 405 has four transmit antennas spaced apart by ½λ*$N_{conventional}$. The number of rows of transmit antennas is arbitrary but transmit array 405 has 32 rows as illustrated. It may thus be appreciated that the virtual array and resulting advantageous tapering as disclosed herein may be extended to a two-dimensional virtual array.

Figure 5:
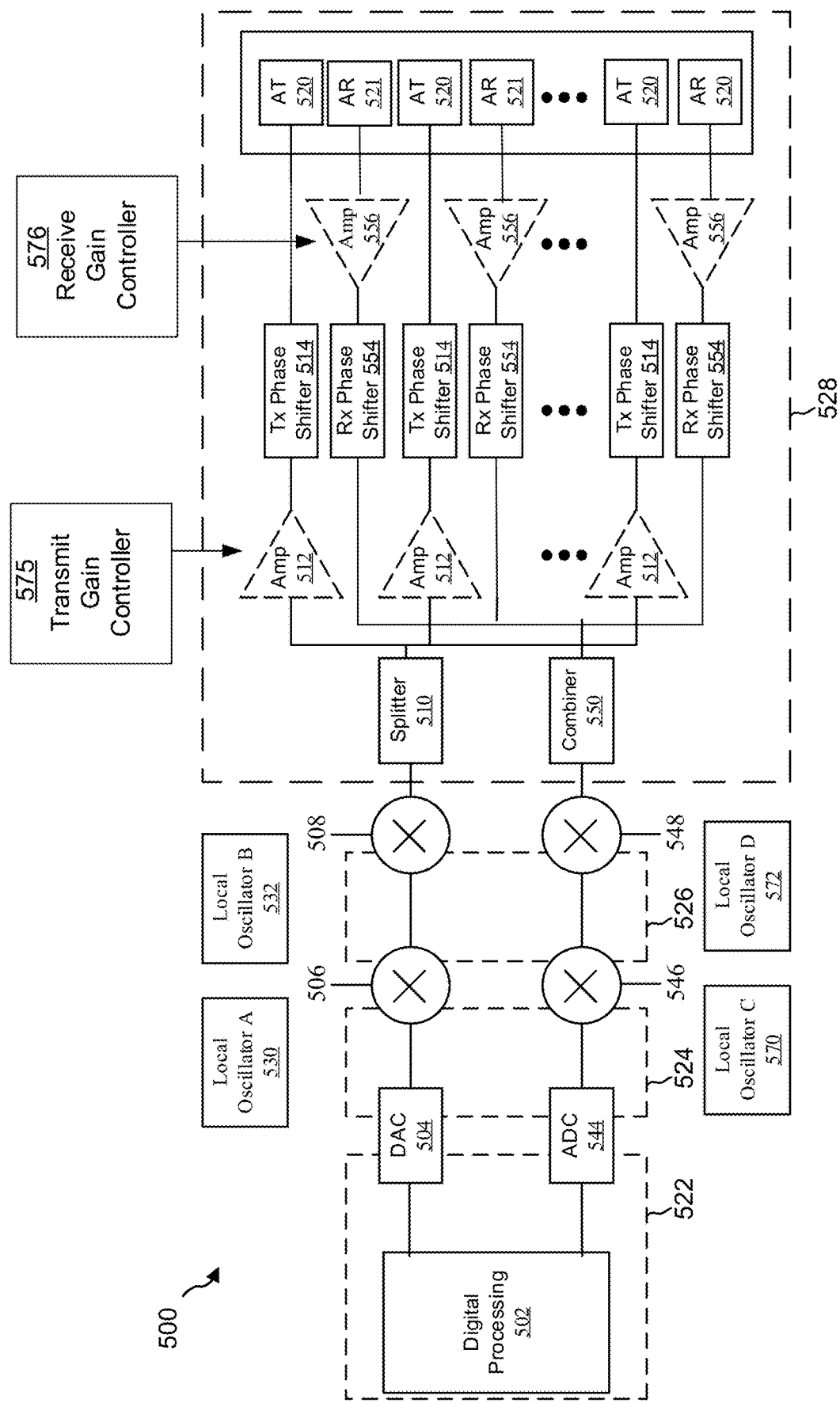
FIG. 5 illustrates a transceiver architecture including a virtual array with improved taper in accordance with an aspect of the disclosure.

A virtual array as disclosed herein may also be advantageously combined with beam-steering. An example MIMO transceiver 500 such as a MIMO radar is shown in FIG. 5 that drives a transmit array of antennas (AT) 520. In some examples, transceiver 500 may be a MIMO radar transceiver for radar applications such as for automotive navigation and collision avoidance. To produce a virtual array operation, the $N_T$ transmitted RF signals from a transmit array of $N_T$ transmit antennas such as transmit antennas 520 are all mutually orthogonal. To produce this mutual orthogonality typically requires a digital-to-analog converter (DAC) for each orthogonal RF signal. However, only a single DAC 504 is shown in FIG. 5 for illustration clarity.

Transceiver 500 also includes an array of receive antennas (AR) 521. Analogous to the DACs for the transmit array, a MIMO system will typically incorporate an analog-to-digital converter (ADC) for each receive antenna 521. However, only a single ADC 544 is shown in transceiver 500 for illustration clarity.

Broadly, FIG. 5 is a diagram illustrating example hardware components of a MIMO system in accordance with certain aspects of the disclosure. The illustrated components may include those that may be for beamforming and transmission of wireless signals. There are numerous architectures that may profit from the virtual array tapering disclosed herein, only one example of which is illustrated in FIG. 5. Transceiver 500 includes a digital processing section 502, a first mixer 506, a second mixer 508, and a splitter 510. The transceiver 500 also includes a plurality of first amplifiers 512 (e.g., power amplifiers) and a corresponding plurality of phase shifters 514. Transmission lines or other waveguides, wires, traces, or the like are shown connecting the various components to illustrate how signals to be transmitted may travel between components. Boxes 522, 524, 526, and 528 indicate regions in the transceiver 500 in which different types of signals travel or are processed. Specifically, box 522 indicates a region in which digital baseband signals travel or are processed, box 524 indicates a region in which analog baseband signals travel or are processed, box 526 indicates a region in which analog intermediate frequency (IF) signals travel or are processed, and box 528 indicates a region in which analog radio frequency (RF) signals travel or are processed. The regions need not be physically localized but may instead be distributed across a chip or device. The transceiver 500 also includes a local oscillator A 530, a local oscillator B 532, a local oscillator C 570, and a local oscillator D 572.

Each of the transmit antennas 520 may include one or more sub-elements (not shown) for radiating RF signals. For example, a single transmit antenna 520 may include a first sub-element cross-polarized with a second sub-element that can be used to independently transmit cross-polarized signals. Each transmit antenna 520 may comprise patch antennas or other types of antennas arranged in a linear, two dimensional, stacked, or another pattern. A spacing between each transmit antenna 520 may be such that signals with a desired wavelength transmitted separately by each transmit antenna 520 may interact or interfere (e.g., to form a desired beam). In general, this spacing will depend upon whether the transmit array or the receive array is the array with the fewer number of antennas. If transmit antennas 520 form the array with the fewer number of antennas, the spacing will typically be multiple wavelengths of the transmission frequency for transceiver 500 (e.g, $\frac{1}{2}\lambda * N_{conventional}$). On the other hand, if transmit antennas 520 form the larger array that is over-sized so that its number of antennas is greater than $N_{conventional}$, the spacing will typically be a half wavelength, or other fraction of a wavelength of spacing between neighboring transmit antennas 520 to allow for the desired interaction or interference of signals transmitted by the separate transmit antennas 520 within that expected range.

The digital processing section 502 processes and generates digital baseband signals and may also control operation of the DAC 504, first and second mixers 506, 508, splitter 510, first amplifiers 512, and/or phase shifters 514 to transmit signals via the transmit antennas 520. The digital processing section 502 may process signals and control operation in accordance with a communication standard such as a wireless standard. The DAC 504 may convert digital baseband signals received from the digital processing section 502 (and that are to be transmitted) into analog baseband signals. The first mixer 506 upconverts analog baseband signals to analog IF signals within an IF using the local oscillator A 530. For example, the first mixer 506 may mix the signals with an oscillating signal generated by the local oscillator A 530 to "move" the baseband analog signals to the IF. In some implementations, some processing or filtering (not shown) may take place at the IF. The second mixer 508 upconverts the analog IF signals to analog RF signals using the local oscillator B 532. Analogously to the first mixer, the second mixer 508 may mix the signals with an oscillating signal generated by the local oscillator B 532 to "move" the IF analog signals to the RF, or the frequency at which signals will be transmitted or received. The digital processing section 502 may adjust the frequency of local oscillator A 530 and/or the local oscillator B 532 so that a desired IF and/or RF frequency is produced and used to facilitate processing and transmission of a signal within a desired bandwidth. In alternative architectures, a single mixer may be used to directly convert the baseband signals into the desired RF signal.

In the illustrated transceiver 500, signals upconverted by the second mixer 508 are split or duplicated into multiple signals by the splitter 510. However, it will be appreciated that such a splitter would only function with respect to a sub-array of transmit antennas 520 that share the same (e.g., mutually-orthogonal) RF signal for transmission. The splitter 510 in transceiver 500 splits such an RF signal into a plurality of identical or nearly identical RF signals, as denoted by its presence in box 528. Each of these signals may correspond to a transmit antenna 520 and the signal travels through and is processed by amplifier 512, phase shifter 514, and/or other elements to be provided to and transmitted by the corresponding transmit antenna element 520. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to a power supply and the RF signals exiting the splitter 510 may be at a power level lower than the RF signal entering the splitter 510.

After being split by the splitter 510, the order of the amplification and optional phase-shifting is arbitrary. Thus, the order of each amplifier 512 and corresponding phase-shifter 514 may be reversed in alternative embodiments. In addition, the RF signal to each transmit antenna 520 may be amplified by more than one amplifier 512 in alternative embodiments. To provide the desired taper (either the first window function or the second window function depending upon which array has more antennas or a smaller spacing between antennas), a transmit gain controller 575 controls the gain of each amplifier 512 so that the desired taper is applied to the RF signal amplitude transmitted by each transmit antenna 520.

Each phase shifter 514 may provide a configurable phase shift or phase offset to a corresponding RF signal to be transmitted. Each phase shifter 514 could be a passive phase shifter not directly connected to a power supply. Alternatively, each phase shifter 514 could be an active phase shifter connected to a power supply such that the active phase shifter provides some amount of gain or prevents insertion loss. The settings of each of the phase shifters 514 are independent meaning that each can be set to provide a desired amount of phase shift or the same amount of phase shift or some other configuration. A suitable controller such as digital processing section 502 may have at least one control line connected to each of the phase shifters 514 and which may be used to configure the phase shifters 514 to provide a desired amounts of phase shift or phase offset between transmit antenna elements 520. In this fashion, a main beam from transmit antennas 520 may be steered as desired to illuminate a radar target.

Transceiver 500 also includes a receive array of receive antennas 521. Each receive antenna 521 may include one or more sub-elements (not shown) for receiving RF signals. For example, a single receive antenna 521 may include a first sub-element cross-polarized with a second sub-element that can be used to independently receive cross-polarized signals. Each receive antenna 521 may comprise patch antennas or other types of antennas arranged in a linear, two dimensional, or another pattern. A spacing between each receive antenna 521 may be such that signals with a desired wavelength received separately by each receive antenna 521 may interact or interfere (e.g., to form a desired beam). In general, this spacing will depend upon whether the receive array or the transmit array is the array with the fewer number of antennas or the greatest spacing between antennas. If receive antennas 521 form the array with the fewer number of antennas or the greatest spacing between antennas, the spacing will typically be multiple wavelengths of the transmission frequency for transceiver 500. On the other hand, if receive antennas 521 form the array with the greater number of antennas or the smallest spacing between the antennas, the spacing will typically be a half wavelength, or some other fraction of a wavelength of spacing between neighboring receive antennas 521 to allow for the desired interaction or interference of signals received by the separate receive antennas 521 within that expected range. Each receive antenna 521 may be associated with a corresponding amplifier 556 such as a low-noise amplifier. A receive gain controller 576 controls the gain applied by each amplifier 556 according to the first window function or according to the second window function depending upon whether the receive antennas 521 form the array with the greater number of antennas or the array with the fewer number of antennas. Although receive gain controller 576 is shown separately from transmit gain controller 575, it will be appreciated that a single controller (e.g., the digital processing section 502) may be used to control both the receive and transmit tapers.

Each receive antenna 521 may correspond to a receive phase shifter 554 to provide a configurable phase shift or phase offset for the corresponding received RF signal. The phase shifter 554 may be an active phase shifter or a passive phase shifter. The settings of the phase shifters 554 are independent, meaning that each can be set to provide a desired amount of phase shift or the same amount of phase shift or some other configuration. The digital processing section 502 may have at least one control line connected to each of the phase shifters 554 and which may be used to configure the phase shifters 554 to provide a desired amount of phase shift or phase offset between receive antenna elements 521. In alternative embodiments, a single mixer may be used to directly down convert the received RF signals to baseband.

In the illustrated transceiver 500, signals output by the phase shifters 554 are combined in a combiner 550. The combiner 550 in transceiver 500 combines the RF signals into a signal, as denoted by its presence in box 528. The combiner 550 may be a passive combiner, e.g., not connected to a power source, which may result in some insertion loss. The combiner 550 may be an active combiner, e.g., connected to a power source, which may result in some signal gain. The output of the combiner 550 is input into mixers 548 and 546. Mixers 548 and 546 generally down convert the received RF signal using inputs from local oscillators 572 and 570, respectively, to create intermediate or baseband signals. The output of the mixers 548 and 546 are input into analog-to-digital converter (ADC) 544 for conversion to analog signals. The analog signals output from ADC 544 are input to digital processing section 502 for baseband processing, e.g., decoding, de-interleaving, etc.

A method of taper for a virtual array will now be discussed as shown in the flowchart of FIG. 6. The method includes an act 600 of adjusting a gain for a plurality of transmit amplifiers according to a first window function to provide a plurality of gain-adjusted amplifiers corresponding to a plurality of transmit antennas spaced apart according to a transmit array spacing. For example, the transmit array spacing may refer to the distance or separation between adjacent antennas in the plurality of transmit antennas. The adjusting of the gain for amplifiers 512 is an example of act 600. The method also includes an act 605 of amplifying a radio frequency (RF) signal through the plurality of gain-adjusted amplifiers to transmit a corresponding amplified RF signal through each of the transmit antennas to produce a reflected RF signal. The transmission of the amplified RF signals through the transmit array 230 or 405, or through transmit antennas 520 is an example of act 605. Moreover, the method includes an act 610 that is for an array of N receive antennas spaced apart according to a receive array spacing and includes receiving the reflected RF signal through the array of N receive antennas to provide a corresponding plurality of received RF signals, N being a positive integer that is greater than the transmit array spacing divided by the receive array spacing. For example, the receive array spacing may refer to the distance or separation between adjacent antennas in the receive antenna array. Operation of receive antennas 521 or of receive arrays 235 and 400 is an example of act 610. The method also includes an act 615 of adjusting a gain for a plurality of receive amplifiers according to a second window function to provide a plurality of gain-adjusted receive amplifiers corresponding to the plurality of received RF signals. The adjustment of the gain for amplifiers 556 is an example of act 615. Finally, the method includes an act 620 of amplifying each received RF signal through the corresponding gain-adjusted receive amplifier to provide a plurality of gain-adjusted received RF signals that are effectively received through the virtual array according to a third window function. The amplification by amplifiers 556 to produce a taper for a virtual array such as improved taper 210 is an example of act 620. Since improved taper 210 has a first half in which the gain increases monotonically from a first minimum value to a maximum value and has a second half in which the gain decreases monotonically from the maximum value to a second minimum value, improved taper 210 is a "window function" as that term is defined herein.

Figure 7:
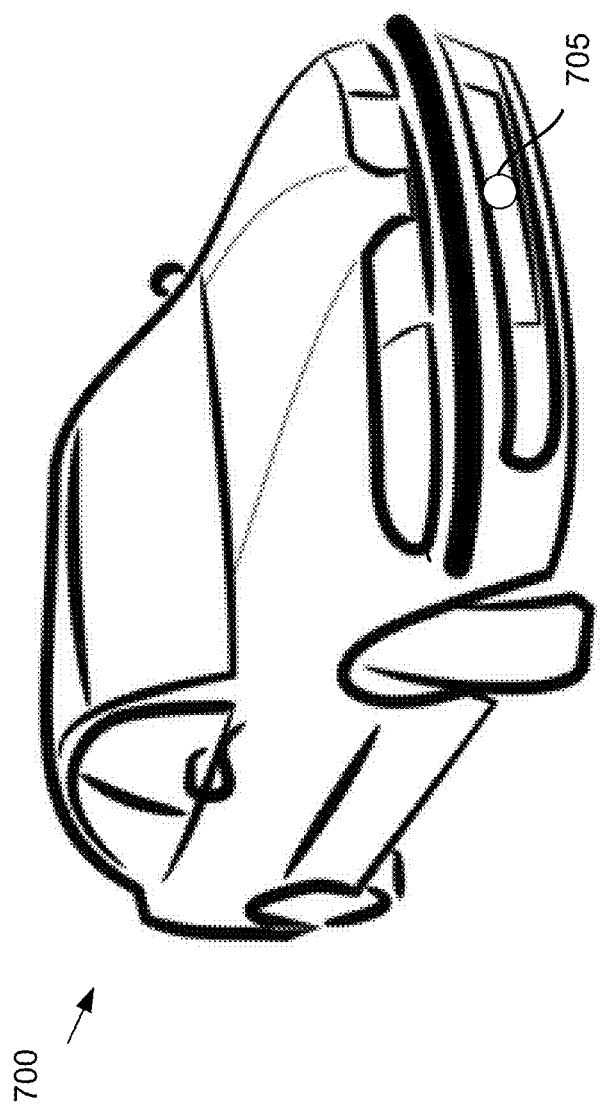
FIG. 7 illustrates an automobile including a MIMO radar with a tapered virtual array in accordance with an aspect of the disclosure.

A virtual array as disclosed herein may be advantageously incorporated into numerous applications such as a MIMO automotive radar. An example automobile 700 including a MIMO radar 705 with a virtual array and an improved taper as disclosed herein is shown in FIG. 7.

It will be appreciated that many modifications, substitutions and variations can be made in and to the materials, apparatus, configurations and methods of use of the devices of the present disclosure without departing from the scope thereof In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A transceiver, comprising:
   a plurality of transmit antennas spaced apart according to a transmit array spacing;
   a plurality of transmit amplifiers corresponding to the plurality of transmit antennas, each transmit amplifier having an output coupled to the corresponding transmit antenna;
   a plurality of N receive antennas spaced apart according to a receive array spacing, the plurality of N receive antennas being configured to receive a plurality of Radio Frequency (RF) signals, N being a positive integer greater than the transmit array spacing divided by the receive array spacing;
   a plurality of receive amplifiers corresponding to the plurality of N receive antennas, each receive amplifier having an input coupled to the corresponding receive antenna and being configured to amplify a corresponding received RF signal; and
   a controller configured to control a gain of each transmit amplifier according to a first window function and to control a gain of each receive amplifier according to a second window function so that the plurality of RF signals is effectively received by a virtual array having a taper defined by a third window function.

2. The transceiver of claim 1, wherein the second window function is selected from a group consisting of a Dolph-Chebyshev window function, a Kaiser window function, a Hamming window function, and a Hann window function.

3. The transceiver of claim 1, wherein N is greater than 1.5 times the transmit array spacing divided by the receive array spacing.

4. The transceiver of claim 1, wherein N is greater than two times the transmit array spacing divided by the receive array spacing.

5. The transceiver of claim 1, wherein the virtual array is a two-dimensional virtual array.

6. The transceiver of claim 1, wherein the plurality of transmit antennas and the plurality of N receive antennas comprise patch antennas.

7. The transceiver of claim 1, wherein the plurality of transmit antennas consists of three transmit antennas and the plurality of transmit amplifiers consists of three transmit amplifiers.

8. The transceiver of claim 7, wherein the first window function has a first amplitude for a first one of the transmit amplifiers, a second amplitude for a second one of the transmit amplifiers, and a third amplitude for a third one of the transmit amplifiers, wherein the first and third amplitudes are approximately 0.66 times the second amplitude.

9. The transceiver of claim 8, wherein the transmit antenna corresponding to the second one of the transmit amplifiers is disposed between the transmit antennas corresponding to the first one and the third one of the transmit amplifiers.

10. The transceiver of claim 1, wherein the plurality of transmit antennas consists of four transmit antennas and the plurality of transmit amplifiers consists of four transmit amplifiers.

11. The transceiver of claim 10, wherein the first window function has a first amplitude for a first one of the transmit amplifiers, a second amplitude for a second one of the transmit amplifiers, a third amplitude for a third one of the transmit amplifiers, and a fourth amplitude for a fourth one of the transmit amplifiers, wherein the first and fourth amplitudes are approximately one half of the second or third amplitudes.

12. The transceiver of claim 11, wherein the second and third amplitudes are approximately equal, and the transmit antennas corresponding to the second one and the third one of the transmit amplifiers are disposed between the transmit antennas corresponding to the first one and the fourth one of the transmit amplifiers.

13. The transceiver of claim 1, wherein the plurality of RF signals has an operating wavelength, and wherein the receive array spacing is approximately one-half of the operating wavelength.

14. The transceiver of claim 13, wherein the transmit array spacing is at least sixteen operating wavelengths.

15. The transceiver of claim 13, wherein the plurality of transmit antennas are arranged into first rows and first columns, the first columns being spaced apart by the transmit array spacing and the first rows being spaced apart by the receive array spacing, and wherein the plurality of N receive antennas are arranged into second rows and second columns, the second columns being spaced apart by the receive array spacing and the second rows being spaced apart by the transmit array spacing.

16. The transceiver of claim 15, wherein the transceiver is a transceiver for a Multiple Input Multiple Output (MIMO) radar.

17. The transceiver of claim 16, wherein the MIMO radar is an automotive MIMO radar.

18. The transceiver of claim 17, wherein the automotive MIMO radar is incorporated into an automobile.

19. The transceiver of claim 1, wherein a maximum sidelobe power for the virtual array is at least 20 dB lower than a main beam power for the virtual array.

20. A transceiver, comprising:
a plurality of M transmit antennas spaced apart according to a transmit array spacing;
a plurality of transmit amplifiers corresponding to the plurality of M transmit antennas, each transmit amplifier having an output coupled to the corresponding transmit antenna;
a plurality of receive antennas spaced apart according to a receive array spacing, the plurality of receive antennas being configured to receive a plurality of Radio Frequency (RF) signals, M being a positive integer greater than the receive array spacing divided by the transmit array spacing;
a plurality of receive amplifiers corresponding to the plurality of receive antennas, each receive amplifier having an input coupled to the corresponding receive antenna and being configured to amplify a corresponding received RF signal; and
a controller configured to control a gain of each transmit amplifier according to a first window function and to control a gain of each receive amplifier according to a second window function so that the plurality of RF signals is effectively received by a virtual array having a taper defined by a third window function.

21. The transceiver of claim 20, wherein M is at least 1.5 times greater than the receive array spacing divided by the transmit array spacing, the plurality of receive antennas consists of three receive antennas, and the second window function has an initial value of approximately 0.66, a center value of one, and a final value of approximately 0.66.

22. The transceiver of claim 21, wherein the first window function is selected from the group consisting of a Dolph-Chebyshev window function, a Kaiser window function, a Hamming window function, and a Hann window function.

23. The transceiver of claim 20, wherein M is at least 1.5 times greater than the receive array spacing divided by the transmit array spacing, the plurality of receive antennas consists of four receive antennas, and the second window function has an initial value of approximately 0.5, a second value of one, a third value of one, and a final value of approximately 0.5.

24. The transceiver of claim 23, wherein the first window function is selected from a group consisting of a Dolph-Chebyshev window function, a Kaiser window function, a Hamming window function, and a Hann window function.

25. A virtual array method comprising:
adjusting a gain for a plurality of transmit amplifiers according to a first window function, each of the transmit amplifiers being coupled to a respective transmit antenna of an array of transmit antennas spaced apart according to a transmit array spacing;
amplifying Radio Frequency (RF) signals through the plurality of transmit amplifiers to transmit respective amplified RF signals through the transmit antennas to produce reflected RF signals;
receiving the reflected RF signals through an array of receive antennas spaced apart according to a receive array spacing to provide a plurality of received RF signals, wherein the transmit array spacing and the receive array spacing are unequal, and wherein a number of antennas in the transmit array or the receive array having a smaller array spacing is greater than a larger array spacing divided by the smaller array spacing;

adjusting a gain for a plurality of receive amplifiers according to a second window function, each of the receive amplifiers being coupled to a respective receive antenna of the array of receive antennas; and amplifying each received RF signal through the respective receive amplifier to provide a plurality of gain-adjusted received RF signals that are effectively received through a virtual array having a taper defined by a third window function.

26. The virtual array method of claim 25, wherein the number of antennas in the array having the smaller array spacing is at least 1.5 times greater than the larger array spacing divided by the smaller array spacing.

27. The virtual array method of claim 26, wherein the second window function is selected from a group consisting of a Dolph-Chebyshev window function, a Kaiser window function, a Hamming window function, and a Hann window function.

\* \* \* \* \*